(12) United States Patent
Hestermeyer et al.

(10) Patent No.: US 9,221,494 B2
(45) Date of Patent: Dec. 29, 2015

(54) METHOD FOR CONTROLLING THE DIRECTIONAL STABILITY OF A VEHICLE, ASSOCIATED STEERING SYSTEM AND VEHICLE

(71) Applicant: FORD GLOBAL TECHNOLOGIES, LLC, Dearborn, MI (US)

(72) Inventors: Thorsten Wilhelm Hestermeyer, Leverkusen (DE); Rudolf Quis, Kerpen (DE); Sergio Trimboli, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/276,959

(22) Filed: May 13, 2014

(65) Prior Publication Data

US 2014/0343790 A1    Nov. 20, 2014

(30) Foreign Application Priority Data

May 14, 2013    (DE) .......................... 10 2013 208 891

(51) Int. Cl.
*A01B 69/00* (2006.01)
*B62D 6/04* (2006.01)

(52) U.S. Cl.
CPC ........................................ *B62D 6/04* (2013.01)

(58) Field of Classification Search
CPC .................................... B62D 6/00; B62D 6/04
See application file for complete search history.

(56) References Cited

U.S. PATENT DOCUMENTS

| | | | |
|---|---|---|---|
| 5,481,457 A | 1/1996 | Yamamoto et al. | |
| 5,528,497 A | 6/1996 | Yamamoto et al. | |
| 5,774,819 A | 6/1998 | Yamamoto et al. | |
| 5,828,972 A | 10/1998 | Asanuma et al. | |
| 5,864,493 A | 1/1999 | Boesch et al. | |
| 6,073,065 A | 6/2000 | Brown et al. | |
| 6,098,296 A | 8/2000 | Perisho, Jr. et al. | |

(Continued)

FOREIGN PATENT DOCUMENTS

| | | |
|---|---|---|
| DE | 19745733 A1 | 4/1999 |
| DE | 102006022663 A1 | 11/2007 |

(Continued)

OTHER PUBLICATIONS

German Examination Report dated Nov. 11, 2013 for German Application No. 102013208891.4.
Partial machine prepared translation of German Examination Report dated Nov. 11, 2013 for German Application No. 102013208891.4.

*Primary Examiner* — Michael D Lang
(74) *Attorney, Agent, or Firm* — Jones Robb, PLLC; Raymond L. Coppiellie

(57) ABSTRACT

A steering system to control a directional stability of a vehicle may include an active power steering assistance system, a sensor to detect vehicle dynamics data of the vehicle, a sensor to detect a torque of a steering system of the vehicle, and a controller. The controller may be configured to determine a torque value based on the vehicle dynamics data, calculate a torque component based on a difference between the torque value and the torque of the steering system, calculate a preliminary compensation torque on a basis of the torque component, calculate a final compensation torque by adding the preliminary compensation torque and the torque value, and actuate the active power steering assistance system based upon the final compensation torque. Systems and methods for controlling directional stability of a vehicle may compensate for short-term pull/drift and long-term pull/drift.

24 Claims, 2 Drawing Sheets

(56) References Cited

U.S. PATENT DOCUMENTS

| | | |
|---|---|---|
| 6,250,421 B1 | 6/2001 | Poshadlo |
| 6,351,694 B1 | 2/2002 | Tseng et al. |
| 6,574,539 B1 | 6/2003 | Ashrafi |
| 7,725,227 B2 | 5/2010 | Pattok et al. |
| 2003/0055543 A1 | 3/2003 | Amberkar et al. |
| 2004/0204808 A1* | 10/2004 | Satoh et al. .................... 701/41 |
| 2005/0182542 A1 | 8/2005 | Kwasny et al. |
| 2009/0030575 A1 | 1/2009 | Kleinau et al. |

FOREIGN PATENT DOCUMENTS

| | | |
|---|---|---|
| DE | 102006057084 A1 | 6/2008 |
| EP | 0822130 A1 | 2/1998 |
| EP | 1006338 A2 | 6/2000 |
| EP | 1247723 A1 | 10/2002 |
| FR | 2801270 A1 | 5/2001 |
| GB | 2370260 A | 6/2002 |

\* cited by examiner

METHOD FOR CONTROLLING THE DIRECTIONAL STABILITY OF A VEHICLE, ASSOCIATED STEERING SYSTEM AND VEHICLE

CROSS-REFERENCE TO RELATED APPLICATIONS

This application claims priority to German patent application 102013208891.4 filed on May 14, 2013, which is hereby incorporated by reference in its entirety.

TECHNICAL FIELD

The present disclosure relates to systems and methods for controlling the directional stability of a vehicle via steering assist.

BACKGROUND

Assistance systems may be used with steering device of vehicles, such as motor vehicles. Assistance systems may range from, for example, power steering systems to independently acting steering systems for use in parking situations. Such systems may be active in the steering process during travel to increase driving comfort and safety for vehicle occupants.

Power steering systems may differ in the form of their respective drives. Customary hydraulically operated power steering systems (HPS="Hydraulic Power Steering") serve primarily for providing pure power assistance steering. They have a hydraulic pump coupled to the vehicle engine in such a way that it transmits torque. The hydraulic pump feeds a continuous volume flow through a hydraulic cylinder including a piston which has pressure applied to both of its sides. In a directionally stable state, this piston is kept virtually pressureless. In the case of a steering lock, the pressure can be increased on one side, as required as a function of the speed, to facilitate movement of the steering device in a necessary direction.

In contrast, other systems have a power steering system with an electrically driven motor (EPS="Electric Power Steering"). By eliminating the hydraulic pump, these systems offer corresponding energetic advantages. In addition, the electric pump of the systems is activated only when necessary so there is no continuous power loss for the vehicle engine when it is operating.

EPS systems permit the possibility of combination with further assistance systems. Thus, it is possible to signal to the driver, for example, driving states that have been detected by the assistance system. Furthermore, such a system can perform active interventions in a steering process to assist and/or relieve the driver. Such systems may also be distinguished in terms of their type of drive. In addition to electrohydraulic operation (EHPS="Electro-Hydraulic Power Steering"), a purely electromechanical implementation may be used (EPAS="Electro Power Assisted Steering"). EHPS systems retain the hydraulically assisted steering system. However, in contrast to simple EPS systems, EHPS systems have an electrically operated hydraulic pump which acts independently of the vehicle engine. In contrast, EPAS systems dispense entirely with a hydraulic system by virtue of the fact that they have an electric motor, which is coupled directly to the steering system.

Conventional power assist systems and methods described above relieve and assist the driver with respect to the force to be applied, as well as with respect to monitoring a vehicle that is equipped in this way. In particular, varying external influences impose stringent requirements upon such systems to provide a completely adaptive complementary interplay between actions and reactions by driver and the auxiliary systems. For example, conventional systems correct for driver input and can also correct for vehicle conditions and/or road conditions. However, in existing power steering assist systems and methods, such corrections are not made sufficiently quickly to respond, for example, to continuously changing conditions, such as road inclination/camber/crown. Thus, in certain power steering assist systems that employ pull drift compensation (PDC), such corrections compensate only for permanent pull (e.g., caused by "permanent" conditions, such as vehicle misalignment) and not for short-term pull (created, for example, by changing road inclination).

For these reasons, it may be desirable to create a power steering assist system with PDC capability to correct for both long-term and short-term pull/drift.

SUMMARY

Exemplary embodiments of the present disclosure may solve one or more of the above-mentioned problems and/or may demonstrate one or more of the above-mentioned desirable features. Other features and/or advantages may become apparent from the description that follows.

In accordance with at least one exemplary embodiment, a method of controlling directional stability of a vehicle having a steering system comprising an active power steering assistance system, comprises (a) acquiring vehicle dynamics data. The method may further comprise (b) identifying a state of directional stability from the acquired vehicle dynamics data. Further, (c) measuring a torque of the steering system, at least in the directional stable state of the vehicle may be included in the method. The method may further comprise (d) calculating a final compensation torque. The method may further comprise (e) actuating the active power steering assistance system with the final compensation torque to counter-compensate the torque of the steering system and measured in step (c). Further, (f) providing a torque value on a basis of the vehicle dynamics data acquired in step (a) may be included in the method. The method may further comprise (g) calculating a torque component from the torque measured in step (c), minus the torque value provided in step (f). The method may further comprise (h) calculating a preliminary compensation torque on a basis of the torque component calculated in step g). Further, (i) calculating the final compensation torque in step (d) from a sum of the preliminary compensation torque calculated in step (h) and the torque value provided in step (f) may be included in the method.

In accordance with another exemplary embodiment, a steering system for controlling a directional stability of a vehicle may comprise an active power steering assistance system, a device to acquire vehicle dynamics data, a device to identify a state of directional stability from the acquired data, a device to measure a torque of the steering system, a device to calculate a preliminary compensation torque, or a final compensation torque at least in a case of a force equilibrium being present in a directionally stable state, from the measured torque, a device to actuate the active power steering assistance system with a final compensation torque based on the preliminary compensation torque to counter-compensate the measured torque of the steering system, and a device to estimate and/or acquire data on restoring forces of the steering system. Data on restoring forces may be taken into account in the calculation of the final compensation torque.

In accordance with another exemplary embodiment, a method of controlling directional stability of a vehicle may comprise acquiring vehicle dynamics data of the vehicle, determining a directional stability state of the vehicle based on the vehicle dynamics data, determining a torque value based on the vehicle dynamics data, calculating a torque component based on a difference between the torque value and a torque of a steering system of the vehicle, calculating a preliminary compensation torque on the basis of the torque component, calculating a final compensation torque by adding the preliminary compensation torque and the torque value, and actuating a power steering assistance system of the vehicle according to the final compensation torque.

In accordance with another exemplary embodiment, a steering system to control a directional stability of a vehicle may comprise an active power steering assistance system, a sensor to detect vehicle dynamics data of the vehicle, a sensor to detect a torque of a steering system of the vehicle, and a controller. The controller may be configured to determine a torque value based on the vehicle dynamics data, calculate a torque component based on a difference between the torque value and the torque of the steering system, calculate a preliminary compensation torque on a basis of the torque component, calculate a final compensation torque by adding the preliminary compensation torque and the torque value, and actuate the active power steering assistance system based upon the final compensation torque.

In accordance with another exemplary embodiment, a method of controlling directional stability of a vehicle may comprise determining a torque value to compensate for short-term pull/drift, calculating a preliminary compensation torque to compensate for long-term pull/drift, calculating a final compensation torque based on the preliminary compensation torque and the torque value, and actuating a power steering assistance system of the vehicle according to the final compensation torque.

Additional objects, features, and/or advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the claims; rather the claims should be entitled to their full breadth of scope, including equivalents.

BRIEF DESCRIPTION OF THE DRAWINGS

The present disclosure can be understood from the following detailed description, either alone or together with the accompanying drawings. The drawings are included to provide a further understanding of the present disclosure, and are incorporated in and constitute a part of this specification. The drawings illustrate one or more exemplary embodiments of the present disclosure and together with the description serve to explain certain principles and operation.

DETAILED DESCRIPTION

Figure 1:
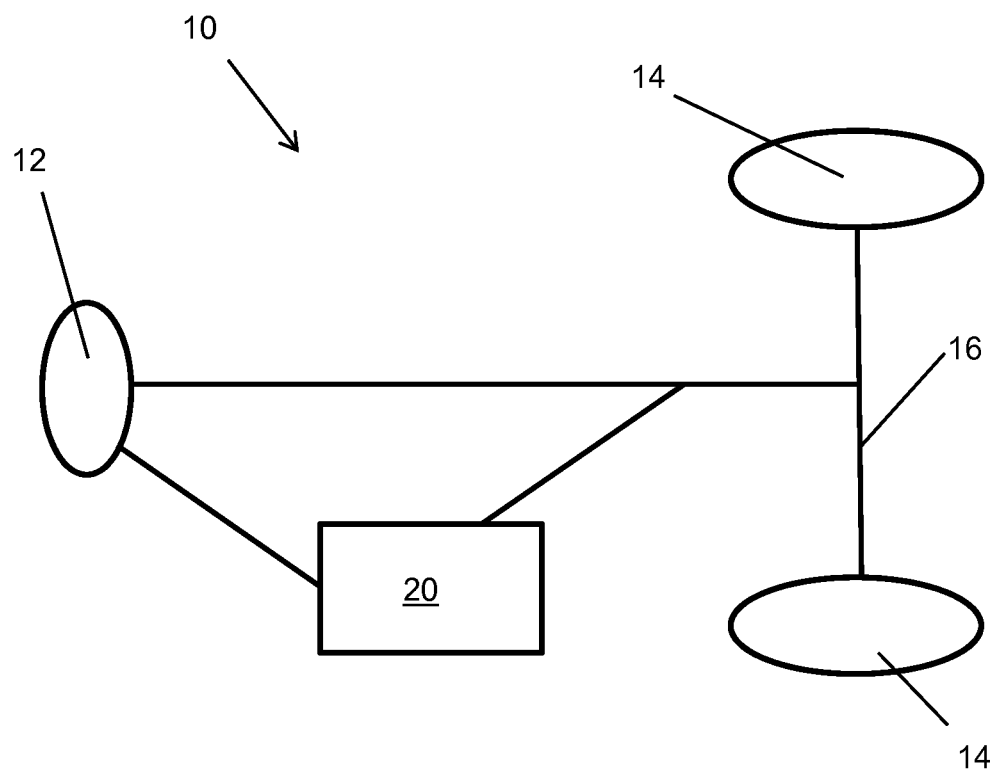
FIG. 1 schematically depicts a power steering system, according to an exemplary embodiment in accordance with the present disclosure.

The present disclosure relates to power steering assist systems and methods to control a directional stability of a vehicle. The systems and methods may include identifying vehicle dynamics data of the vehicle. A state of directional stability may be determined on the basis of the acquired vehicle dynamics data. A torque value may be determined on a basis of the vehicle dynamics data. A torque of the steering system, such as, for example, a torque applied by a driver to a steering wheel, may be measured. A torque component may be calculated on the basis of the torque of the steering system and the torque value. For example, the torque component may be calculated based on a difference between the torque of the steering system and the torque value. A preliminary compensation torque may be calculated on a basis of the torque component. A final compensation torque may be calculated on a basis of the preliminary compensation torque and the torque value. For example, the final compensation torque may be calculated by summing the preliminary compensation torque and the torque value. An active power steering assistance system of a vehicle may be actuated on a basis of the calculated final compensation torque.

In vehicles with an EPAS system, if no additional automatic correction of a pulling effect or compensation of drifting (PDC=Pull Drift Compensation) is performed, demanding situations for a person steering the vehicle will occur in a normal directionally stable state. As used herein, the pulling effect is understood here to be, for example, an unacceptable level of effort to hold onto the steering wheel in order to make directional stability possible. Drifting means, for example, the readiness of the vehicle to move too quickly away from a straight direction of travel when traveling hands free of a steering wheel. Thus, the driver is forced to apply constant torque upon the steering wheel in the form of counter steering, particularly on bulging roads that drop away to the side, and when there is a generally severe inclination of the road. To reduce the effort required for this, corresponding PDC systems are incorporated into modern EPAS systems.

Basically, when torques have to be applied by the steering person or the respective system, it is necessary to differentiate between long-term and short-term pull/drift (pull/drift components). Long-term corrections relate to unavoidable effects, inherent in the vehicle, of faulty adjustment of the vehicle or adjustment which has become faulty. These effects may result, for example, from different tire pressures or from an adjustment of the steering geometry. Short-term pull drift components are usually caused by external influences such as, for example, by a suddenly occurring side wind, camber of the road, or inclination of the road. These influences can act on the vehicle dynamics in such a way that the vehicle drifts.

A disadvantage of conventional PDC implementations, which may be provided for the correction of a pulling effect and compensation for drifting, has proven in practice to be the inability of the implementations to react in a short time to suddenly changing road conditions. This results in an asymmetrical steering sensation, particularly in the case of overtaking maneuvers on roads with a severe inclination.

Against this background, the various exemplary embodiments described herein regard methods of controlling an EPAS system with a PDC system for a steering device of a vehicle, such as a motor vehicle, so that the reaction time is shortened to a change in the respective influences for steering of the vehicle. Various exemplary embodiments described herein also regard steering systems for a vehicle and a corresponding vehicle that have excellent vehicle dynamics and quick responsiveness to driving behavior of the person steering the vehicle.

It is to be noted that the features described generally above and specified individually in the following description can be combined with one another in any desired technically appropriate way and disclose further refinements of the disclosed teachings.

The various exemplary embodiments described herein may be used with a steering system. FIG. 1 illustrates an exemplary embodiment of a power steering system 10 that includes a steering wheel 12, wheels 14 coupled to an axle 16, and a control unit 20. According to an exemplary embodiment, control unit 20 may issue commands to control power steering system 10, such as to issue commands to a motor (not shown) actuating power steering for wheels 14. Control unit 20 may further be utilized as a PDC system and to control directional stability of a vehicle including power steering system 10 according to the various teachings described herein.

According to an exemplary embodiment, a power steering assist system includes a PDC system for directional stability of a motor vehicle. The steering assistance system can be, for example, an EPAS system or EHPS system. Due to their comparatively inexpensive design, these systems are widespread and can be actuated particularly precisely. The system utilizes sensors, for example, existing vehicle sensors, to acquire data on vehicle dynamics. The vehicle dynamics data may represent, for example, a movement state or load state of a vehicle.

According to an exemplary embodiment, the vehicle dynamics data may be selected from the following group, individually or in combination: yaw rate, lateral acceleration, steering angle, rotational speed of the wheels, vehicle speed, torsion bar torque, steering wheel setting angle, steering rack displacement, and steering rack speed. According to a further exemplary embodiment, the vehicle dynamics data may be selected from: yaw rate, lateral acceleration, and steering wheel setting angle, and combinations thereof. According to another exemplary embodiment, the vehicle dynamics data may be selected from yaw rate and lateral acceleration, and combinations thereof. The vehicle dynamics data may be selected, for example, to define a torque value (as will be discussed below) that assists in the removal of noise from calculations made by a steering control system (e.g., PDC system).

According to the present teachings, the vehicle dynamics data is used for the identification of a directionally stable state. The vehicle dynamics data is acquired substantially instantaneously, according to an exemplary embodiment. As a result, a method of controlling the power assisted steering system with the PDC, in accordance with the various exemplary embodiments described herein, can detect any undesired changes in the vehicle dynamics as quickly as possible and respond without delay.

The system is configured to sample the selected vehicle dynamics at a determined sampling rate. The sampling rate may be adapted based on a desired torque compensation. A high sampling rate may generally introduce greater noise into PDC functions than a low sampling rate, with the possibility of high sampling rates disruptively interacting with a driver by producing counter torques opposite to a driver's intended steering torque. Conversely, although a low sampling rate may permit a PDC system to correct effects that occur over a period of time (e.g, long-term pull/drift due to, for example, vehicle misalignment, small amounts of road crown or camber, and other long-term corrections), a low sampling rate is less responsive to effects that occur quickly in a short period of time (e.g., short-term pull/drift due to, for example, road crown or camber quickly changing). Thus, in one exemplary embodiment, a sampling rate of the vehicle dynamics data may correspond to a desired torque compensation. According to exemplary embodiment, sensing of vehicle dynamics variable(s) takes place with a comparatively high sampling rate of, for example, about 10 ms to about 100 ms. The sampling rate may be selected, for example, to determine a plurality of compensation torques in sequence during a directionally stable state. In this way, short-term compensation, as described below, may be achieved.

In accordance with the present teachings, sampling rate may be set in different ways. For example, the sampling rate may be set by a user, it may be predetermined, or it may be a function of the speed of the vehicle.

According to an exemplary embodiment, the data is determined, for example, by devices usually present in the vehicle. For example, the yaw rate and lateral acceleration may be determined and output by a system already present in the vehicle, such as sensors normally associated with an electronic stability program ESP. Such stability programs are also known by the abbreviation ESC (electronic stability control) or DSC (dynamic stability control). To the extent a vehicle does not include an ESC or DSC system, the vehicle may be provided with appropriate sensors, such as sensors associated with a control system of a power steering assist system with PDC.

According to an exemplary embodiment, a method of controlling directional stability of a vehicle includes identifying a state of directional stability of the vehicle based on acquired vehicle dynamics data. For example, at least one value of the acquired data or a value derived from the data may fall below or above a predetermined threshold value for a predetermined time period or a predetermined travel distance, thus identifying a need for directional stability control. The time period or the distance can be predetermined, for example, as a function of the speed of a vehicle, according to an exemplary embodiment.

In a state of directional stability, a torque which is present or is to be applied at the steering system may be measured. For example, the torque may be a torque applied by a driver steering the vehicle to maintain the directionally stable state of the vehicle. The respective torque can therefore be measured, for example, at the torsion bar or at the associated control pinion of the steering apparatus of a vehicle during a steering operation, according to an exemplary embodiment.

A final compensation torque may be calculated from the measured torque. The active power steering assistance system may be actuated according to the final compensation torque to counter-compensate the torque present at the steering system and previously measured, thereby assisting the driver to maintain directional stability of a vehicle. This ensures that the vehicle dynamics and, if appropriate, the subjective driving sensation of the driver are enhanced. The positive driving sensation experienced by a driver may be because the driver need not conduct any steering (e.g., apply a torque to a steering wheel) to maintain a directionally stable state (e.g., maintain the vehicle along a substantially straight path a road traveled upon is straight) of a vehicle. In addition, the various exemplary embodiments described herein may enhance road safety because a vehicle behaves according to the visually perceived expectations of a driver.

According to an exemplary embodiment, a torque value may be available that is based on the acquired vehicle dynamics data (e.g., a sensed lateral acceleration of a vehicle). The torque value based on the acquired vehicle dynamics data may be used to calculate a torque component. For example, a torque component may be calculated by subtracting the torque value based on the vehicle dynamics data from the measured torque of the steering system (e.g., applied by the driver). Thus, various exemplary embodiments described herein, provide in this context the generation of a preliminary compensation torque, such as via a PDC system of a vehicle. The preliminary compensation torque may be calculated in such a way that, in addition to the previously acquired data (e.g., sensed vehicle dynamics data) and measured data (e.g., the measured torque at the steering system), a previously calculated torque component (e.g., preliminary compensation torque calculated at a previous time or control cycle) may be used as a preliminary compensation torque (e.g., for a present time or control cycle), according to an exemplary embodiment.

A stability program (e.g., ESP) already present in a vehicle may be used in the various exemplary embodiments described herein. For example, components of a vehicle stability system for sensing a lateral acceleration may be utilized to sense the lateral acceleration and provide the lateral acceleration to the PDC. Thus, a PDC algorithm can be used, for example, to correct incorrect settings of a vehicle and/or compensate for pull/drift interference. In this context, the calculated torque component may represent the interference to be compensated for or corrected by the PDC system.

Thus, according to various exemplary embodiments, the measured torque of a steering system (e.g., a torque applied by a driver) is not input directly into a calculation for a final compensation torque by a PDC system. Instead, a torque value used for the calculation may be based on a torque component from which a torque value is first removed, with the torque value being based upon acquired vehicle dynamics data (e.g., lateral acceleration) of a vehicle. The remaining torque component may be provided to the PDC system, with the torque component still including those components which are to be corrected or compensated for by the PDC system, which may result from, for example, an incorrect alignment of the vehicle (e.g., wheel camber, wheel caster, and/or wheel toe angle) and/or the pull and drift states, according to an exemplary embodiment.

A PDC system of a vehicle may calculate a preliminary compensation torque on a basis of a torque component calculated according to the various exemplary embodiments described herein. The preliminary compensation torque may therefore be based upon the difference between the measured torque of a steering system (e.g., torque applied by a driver) and the torque value based upon the acquired vehicle dynamics data (e.g., the lateral acceleration of the vehicle). A final compensation torque may be obtained by summing the preliminary compensation torque and the torque value based upon the acquired vehicle dynamics data (e.g., the measured lateral acceleration). The calculated final compensation torque is used to actuate the active power steering system (EPAS or EHPS) to counter-compensate the torque present at the steering system and applied by the driver, in accordance with the present teachings.

The various exemplary embodiments described herein therefore advantageously use the acquired vehicle dynamics data (e.g., the measured lateral acceleration of the vehicle) to differentiate a long-term pull from a short-term pull which results, for example, from the inclination of the road. In this way, a reaction time of the system is significantly increased because it can react in real time to changing circumstances. In order to compensate for the disadvantages of a conventional PDC system (e.g., compensating only for permanent pull and not short term pull), the various exemplary embodiments described herein provide a close link between vehicle dynamics and the compensation torque calculated by the PDC system. As a result, a dynamic pull/drift compensation or correction system is established (DPDC="Dynamic Pull Drift Compensation") to counter changing road conditions and misalignments of the vehicle during the stable driving state. According to an exemplary embodiment, an ESP system already present in a vehicle, or the sensor thereof, may be used to acquire the vehicle dynamics data (e.g., to sense the lateral acceleration of the vehicle), and thus the various exemplary embodiments described herein need not require any additional components than those already present in a vehicle. However, as will be understood by those of skill in the art, appropriate sensors may be provided to use a system in vehicles that do not include an ESP system.

As disclosed herein, a torque value based upon acquired vehicle dynamics data may include a rejection factor. A rejection factor may be used to accommodate, for example, a bulging road (e.g., crown or camber of a road) when executing a lane change or when overtaking another vehicle (e.g., in a passing lane), or may be used to avoid asymmetry in steering behavior, such as when changing lanes back to an original lane. For example, a road may include two lanes, with each lane having a different bank or slope, such that a road bank split can be defined as the difference of road banks between left and right lane. When a PDC system has reached a steady state, such as when driving sufficiently long in one lane, the vehicle may drive straight with no pull being experienced by a driver. If the driver executes a lane change, such as to overtake another vehicle, the driver changes lanes to the second lane and experiences a pull due to the road bank of the second lane and due to a torque compensation provided by the PDC for the road bank of the first lane, which both can be in an opposite direction to the pull due to the road bank of the first lane. In such a situation, the PDC may need time to recover from the different road bank of the second lane (e.g., at least 30 seconds), and compensate for the new road bank. According to the teachings described herein, a torque value based on vehicle dynamics data may be removed from the torque calculation executed by a PDC system so that the PDC system compensates only for slow changing components (e.g., rejects or compensates for vehicle misalignments and road crown and/or camber occurring over a period of time), with the fast changing components (e.g., occurring quickly over a short period of time) being compensated by calculating a final compensation torque on the basis of the calculation by the PDC system and a torque based on vehicle dynamics data. As a result, the driver will not be substantially affected by a PDC correction when changing lanes.

According to an exemplary embodiment, the acquired vehicle dynamics data may be subjected to low-pass filtering, such as to eliminate high-frequency interference. Additionally or alternatively, the acquired vehicle dynamics data may be subjected to linear filtering.

In accordance with one aspect of the present disclosure, an active power steering assistance system is not actuated unless a calculated compensation torque is above a predetermined limiting value and/or the actuation of the active power steering assistance system is limited to (e.g., at or below) a predetermined limiting value. The predetermined limiting value may be, for example, a predetermined maximum value for the calculated compensation torque. The predetermined maximum value for the compensation torque may be provided, for example, to prevent excessive compensation, and therefore excessive destruction of the steering geometry. Excessive compensation can lead, for example, to excessive asymmetry in steering behavior, as a result of which the steering behavior is adversely affected when navigating bends (curves) in the road. In accordance with present teachings, a fault and/or an acoustic and/or visual warning message may be output to a driver in the event the calculated compensation torque reaches or exceeds the predetermined limiting value. As a result, the driver or, for example, service personnel can be warned to facilitate maintenance of the vehicle.

According to an exemplary embodiment, restoring forces may be taken into account when calculating a compensation torque. As a result, the vehicle dynamics and subjective driving behavior of vehicle driver can be accounted for, to a particular degree. Additionally, the speed of processing/reacting to short term changes in conditions is maximized and made more precise, thus maximizing the driver's comfort. For example, a torque value based upon vehicle dynamics data in the various exemplary embodiments described herein may be an absolute value. For instance, a lateral acceleration or yaw rate toward a right side of a road may have different sign than a lateral acceleration or yaw rate toward a left side of the road. In view of this, an absolute value of the torque value may be utilized. The compensation torque to be actually applied, i.e., the compensation torque that brings about the directionally stable state of the vehicle without intervention by the driver, may therefore be achieved with a relatively high accuracy. In addition, the speed of determining the compensation torque is considerably enhanced, even in a plurality of steps, such as, for example, during the formation of mean values described in the exemplary embodiments below. In this way, fewer steps may be required to obtain a final compensation torque to be applied, i.e., a desired compensation torque.

In accordance with one aspect of the present disclosure, friction forces (e.g., friction forces within a steering system) may be ignored when calculating the compensation torque.

The acquisition of vehicle dynamics data (e.g., sensing of the lateral acceleration using at least one lateral acceleration sensor) may be used, according to the various exemplary embodiments described herein, to make the PDC algorithm less sensitive to, for example, sudden changes in the inclination of a road. As a result, an overall more stable driving behavior may be possible, wherein the power steering assistance is oriented in an improved way toward the real conditions and influences. According to an exemplary embodiment, an observer module may be provided to acquire the vehicle dynamics data. For example, an observer module may be used to acquire any lateral acceleration values of a vehicle sensed, for example, by an acceleration meter. The observer module may be designed to derive from the acquired vehicle dynamics data values a corresponding torque value which can be included in the calculation of the power steering assistance (e.g., calculation of the torque component described above). The observer module can use, as a calculating basis, a function of the acquired vehicle dynamics data (e.g., lateral acceleration) having any desired complexity. For example, the observer module may use a nonlinear relation between the acquired vehicle dynamics data and the torque value, which may correspond to quickly changing (e.g., short-term) conditions. The observer module can be, for example, a filter, such as an FIR filter, according to an exemplary embodiment.

An exemplary embodiment in which an assistance torque is applied by an active power steering assistance system, and any restoring torques are taken into account, will be described below.

A compensation force $F_\delta$ to be applied at a steering system (e.g., steering rack) may be determined in this embodiment according to the following formula:

$$F_\delta = F_{rd} + F_a + F_{rst}$$

When converted into associated torques, this corresponds to:

$$T_\delta = T_{rd} + T_a + T_{rst} - T_{alt} \quad (1)$$

With $T_\delta$ being a compensation torque. $F_{rd}$ is a force present at the steering mechanism, for example at the steering rack of the steering system, or alternatively a torque present at the torsion bar (which is measured) and $T_{rd}$ being the torque present at the steering mechanism, which is estimated from force $F_{rd}$. As will be explained below, the corresponding torque can alternatively be measured by, for example, the active power steering assistance system and output. As a result, $T_{tb}$ may be subsequently selected and used in the above formula (1). $T_a$ is an assistance torque applied by an active power steering assistance system to maintain a directionally stable state may also be determined.

In another exemplary embodiment, a torque $T_a$ provided to an active power steering assistance system may be estimated without additional measurement of torques. For example, the assistance torque $T_a$ applied by an active power steering assistance system may be determined on a basis of a current present at a motor of an electrically operated active power steering assistance system. In another example, torque $T_a$ may be estimated on the basis of a boost curve of an active power steering assistance system using a previously measured or estimated torque $T_{rd}$, which is present at the steering mechanism (e.g., a steering rack of a steering system) and an instantaneous speed of a vehicle, and added to torque $T_{rd}$. In addition, torque $T_{alt}$, which may be based, for example on a vehicle lateral acceleration, is subtracted and a torque $T_{rst}$, which is based on restoring forces of the wheels, are added to $T_{rd}$ and $T_a$. The compensation torque $T_\delta$ obtained in this way may be supplied to an active power steering assistance system to forcibly bring about a directionally stable state of the vehicle without intervention by the driver.

According to an exemplary embodiment, restoring force values for restoring a wheel to a substantially straight direction are, for example, measured in a driving state of the vehicle and/or estimated from measured values. The restoring forces may be based, for example, on a mechanical configuration of a vehicle wheel suspension and on rolling properties of the tires of the vehicle.

A calculated compensation torque may be stored, according to an exemplary embodiment. For example, a calculated compensation torque may be stored in a memory and a stored compensation torque can be overwritten by a more up to date value in the memory.

According to an exemplary embodiment, a calculated compensation torque may be reset. For example, a poor directional stability may be due to a fault which is inherent in the vehicle, such as a faulty adjustment of a steering system. As a result, it may be advantageous to reset the stored value of a compensation torque after the fault has been remedied. The compensation torque can be set to zero, for example, or to some other predetermined value.

According to an exemplary embodiment, a plurality of compensation torques may be averaged. The plurality of compensation torques may be obtained, for example, over a plurality of directionally stable states or at a plurality of times during a directionally stable state. The averaging may be performed, for example, to obtain an average long-term compensation torque. Various statistical methods can be used to determine mean values. The calculation of mean values may prevent, for example, temporary short-term effects from influencing the calculation of the compensation torque too severely. According to an exemplary embodiment, sliding mean values may be used. Mean values may be calculated, for example, according to the following formula:

$$\overline{X}_k = \frac{(k-1) \cdot \overline{X}_{k-1} + X_k}{k} + T_{alt} \quad (2)$$

where $X_k$ is an instantaneous value ($T_\delta$+old compensation value), $\overline{X}_{k-1}$ is a preceding mean value, k is a current index, k−1 is a preceding index, and $\overline{X}_k$ is a new mean value obtained.

In addition to calculating an average long-term compensation torque over a plurality of directionally stable states, a single compensation torque may be calculated during one directionally stable state, with the compensation torque being used for instantaneous compensation for what is referred to as a short-term compensation torque. The compensation torque may thus be used to compensate for a short-term fault, such as a short-term fault not inherent in a vehicle, in a directionally stable state by actuating an active power steering assistance system according to the short-term compensation torque. A short-term external effect on the vehicle may be, for example, a side wind or a camber or inclination of a roadway surface.

According to an exemplary embodiment, a short-term compensation torque may be calculated independently of a long-term compensation torque. For example, a short-term compensation torque may be calculated in intermediate steps so that a long-term compensation takes place independently of the short-term compensation.

Various exemplary embodiments described herein may include intermediate steps. Intermediate steps may comprise, for example, a determination of how and/or whether a determined short-term compensation torque is included in a calculation of an average long-term compensation torque. For example, on a basis of a predetermined limiting value for a measured torque (e.g., torque of a steering system) or a predetermined limiting value for a deviation between a present mean value of a long-term compensation and a short-term compensation, it may be determined whether or not a currently determined value is included in the long-term compensation. According to an exemplary embodiment, a PDC system may comprise one or more short-term compensation components (e.g., fast sampling) and one or more long-term compensation components (e.g., slow sampling) in series or in parallel. For example, a PDC system can weigh contributions of torque from the short-term compensation component(s) and long-term compensation component(s) and add the contributions to the assistance torque. For example, in a series configuration, a short term (e.g., pre-filtering via integration) torque contribution can be added with a long-term (e.g., filtering) torque contribution. The basis of this deviation may be used, for example, to decide what portion of the currently determined value is included in the determination of the mean value (i.e. in the long-term compensation) and what portion is used for additional short-term compensation, according to an exemplary embodiment. These measures may facilitate exclusion of short-term faults in lane keeping, which are not inherent in the vehicle, from inclusion in the determination of a long-term compensation torque.

According to an exemplary embodiment, a torque fed into a power steering assistance system may be increased to a calculated compensation torque in a time-dependent fashion during actuation of the active power steering assistance system. The time-dependent increase of the torque may provide a driver with an acclimatization phase to a driving sensation brought about by the compensation. As a result, a driver may be less surprised by a changed steering behavior. A duration of the adaptation (i.e., the increase) of the torque to the calculated compensation torque can take place, for example, in a speed-dependent fashion or, for example, as a function of a difference in absolute value between a preceding compensation torque and a newly calculated compensation torque. According to an exemplary embodiment, the adaptation may take place during a calculation of mean values because the determined compensation torque is multiplied by a factor of less than 1, with the result that the compensation torque is gradually increased when calculating the mean values.

The various exemplary embodiments described herein may be used with a steering system to facilitate directional stability of a vehicle. The various exemplary embodiments described herein, including the steering systems, may be used, for example, in an associated vehicle.

According to an exemplary embodiment, a steering system comprises, for example, an active power steering assistance system, for a device to acquire vehicle dynamic data, identifying device to identify a state of directional stability from the acquired data, a device to measure a torque present at the steering system, at least in the directionally stable state, a device to calculate a preliminary compensation torque (or a necessary final compensation torque in the case of equilibrium forces resulting in a directionally stable state) from the measured torque, actuating device to actuate the active power steering assistance system according to a final compensation torque to counter-compensate the measured torque present at the steering system, and a device to store and/or acquire data for restoring forces of the steering system, which may be taken into account in the calculation of the compensation torque.

Figure 2:
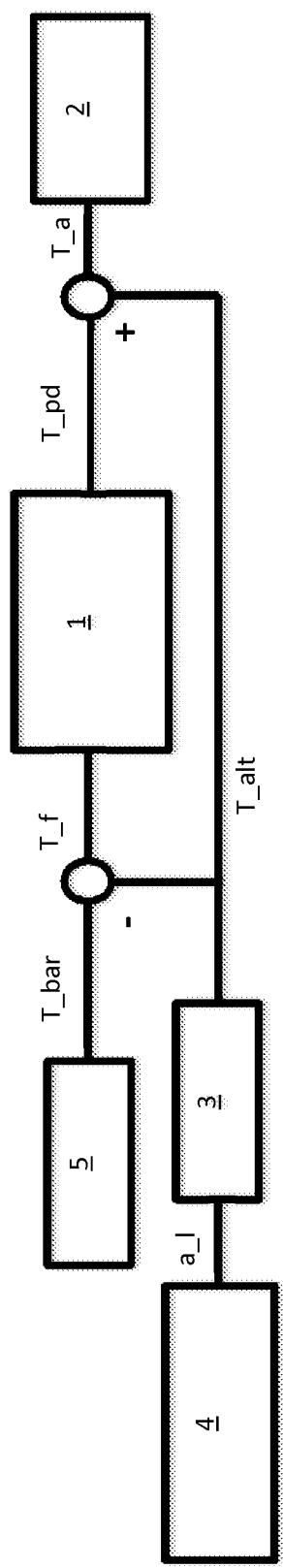
FIG. 2 schematically depicts a method of calculating a compensation torque, according to an exemplary embodiment in accordance with the present disclosure.

An exemplary embodiment of controlling a directional stability of a vehicle will now be described with reference to FIG. 2. As shown in the exemplary embodiment of FIG. 2, a PDC system 1 may be used to actuate an active power steering assistance system 2, such as on a basis of acquired and measured input signals and input data. PDC system 1 may comprise, for example, various functions, such as, for example, an assistance strategy function (e.g., basic assistance to the driver), as well as other functions (e.g., lane keeping system), to provide an overall PDC algorithm. The active power steering assistance system 2 may be, for example, an EPAS system.

As described in the various exemplary embodiments above, vehicle dynamics data may be acquired and a torque value may be determined on the basis of the acquired vehicle dynamics data. For example, an acceleration meter 4 may sense a lateral acceleration a_l of a vehicle. The torque value may be determined from the vehicle dynamics data by, for example, an observer module 3. An observer module 3 may determine, for example, a torque value T_alt on the basis of acquired vehicle dynamics data to provide a torque value T_alt that substantially removes noise from the torque compensation calculations, with T_alt representing short-term (e.g, fast changing) conditions. For example, observer module 3 may determine torque value T_alt based upon the lateral acceleration a_l sensed by acceleration meter 4. However, observer module 3 is not limited to using only lateral acceleration a_l and may determine torque value T_alt on the basis of vehicle dynamics variables other than a lateral acceleration, according to an exemplary embodiment. Observer module 3 may utilize, for example, individually or in combination: yaw rate, lateral acceleration, steering angle, rotational speed of the wheels, vehicle speed, torsion bar torque, steering wheel setting angle, steering rack displacement, and steering rack speed. For example, observer module 3 may utilize lateral acceleration and/or yaw rate. In view of this, observer module 3 may include appropriate algorithms to calculate torque value T_alt based upon the acquired vehicle dynamics data.

A torque of a steering system may be determined. For example, a force applied by a driver 5, such as, for example, a male or female driver, to a steering wheel of a vehicle may also be determined. A resulting torque T_bar of the steering system may be measured and combined with the torque value T_alt. According to an exemplary embodiment, torque value T_alt may be subtracted from torque T_bar, to determine a torque component T_f. The torque component T_f may be supplied to the PDC system 1.

PDC system 1 may calculate a preliminary compensation torque T_pd on the basis of the torque component T_f and any further input signals or input data. However, the preliminary compensation torque T_pd may not yet be used to actuate power steering assistance system 2 (e.g., EPAS). Instead, the preliminary compensation torque T_pd may be combined with the previously provided torque value (e.g., T_al), such as by adding the preliminary compensation torque T_pd and the torque value T_al, to form a final compensation torque T_a. Only the final compensation torque T_a need be used to actuate active power steering assistance system 2.

The various exemplary embodiments described above for improving the directional stability of a vehicle having a steering system, including the steering system and vehicle, are not restricted to the measures and embodiments disclosed herein but rather, of course, also comprise similarly acting further measures and embodiments.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

It is to be understood that the particular examples and embodiments set forth herein are non-limiting, and modifications to structure, dimensions, materials, and methodologies may be made without departing from the scope of the present teachings.

Other embodiments in accordance with the present disclosure will be apparent to those skilled in the art from consideration of the specification and practice of the invention disclosed herein. It is intended that the specification and examples be considered as exemplary only, with a true scope and spirit being indicated by the following claims.

This description and the accompanying drawings that illustrate exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements.

Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The method described above can be performed in one or more devices of the vehicle. For example, the method can be performed by a control device of the brake system such as a central control unit (not shown) or controller. The control device can be implemented within any element of the hydraulic brake system such as a control unit. Alternatively, the control device can be a separate device from any of the above-described hydraulic brake system elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

What is claimed is:

1. A method of controlling directional stability of a vehicle having a steering system comprising an active power steering assistance system, the method comprising:
   a) acquiring vehicle dynamics data;
   b) identifying a state of directional stability from the acquired vehicle dynamics data;
   c) measuring a torque of the steering system, at least in the directional stable state of the vehicle;
   d) calculating a final compensation torque;
   e) actuating the active power steering assistance system with the final compensation torque to counter-compensate the torque of the steering system and measured in step c),
   f) providing a torque value on a basis of the vehicle dynamics data acquired in step a);
   g) calculating a torque component from the torque measured in step c), minus the torque value provided in step f);
   h) calculating a preliminary compensation torque on a basis of the torque component calculated in step g); and
   i) calculating the final compensation torque in step d) from a sum of the preliminary compensation torque calculated in step h) and the torque value provided in step f).

2. The method as claimed in claim 1, wherein restoring forces are taken into account in step (d) or (h) by adding a restoring torque absolute value to a torque absolute value measured during directional stability.

3. The method as claimed in claim 2, wherein the restoring forces are measured or estimated during a driving state of the vehicle.

4. The method as claimed in claim 1, wherein in step (d) or (h) an assistance torque applied by the active power steering assistance system is taken into account.

5. The method as claimed in claim 1, wherein at least one of the final compensation torque and the preliminary compensation torque is calculated from the measured torque of the steering system over a plurality of directionally stable states or at a plurality of times during directional stability and averaged to calculate an average long-term compensation torque.

6. The method as claimed in claim 5, wherein, in addition to the average long-term compensation torque, a compensation torque is calculated over a directionally stable state to obtain a short-term compensation torque.

7. The method as claimed in claim 6, further comprising, in an additional intermediate step in step (d) or (h), determining how and/or whether the short-term compensation torque is included in the calculation of the average long-term compensation torque.

8. The method as claimed in claim 1, wherein in step (a) the acquired vehicle dynamics data comprises at least one of: yaw rate, lateral acceleration, steering angle, rotational speed of wheels of the vehicle, vehicle speed, torsion bar torque, steering wheel setting angle, steering rack displacement, and steering rack speed.

9. The method as claimed in claim 1, wherein the directionally stable state is determined due to at least one value of the acquired vehicle dynamics data dropping below a predetermined threshold value for a predetermined time period or a predetermined distance.

10. The method as claimed in claim 1, wherein during the actuation of the active power steering assistance system the actuation is increased gradually to the calculated final compensation torque.

11. The method as claimed in claim 1, wherein the acquired vehicle dynamics data comprises a lateral acceleration of the vehicle and the torque value is provided on a basis of the lateral acceleration.

12. The method as claimed in claim 1, wherein the acquired vehicle dynamics data comprises a yaw rate of the vehicle and the torque value is provided on a basis of the yaw rate.

13. A steering system for controlling a directional stability of a vehicle, comprising:
   an active power steering assistance system;
   a device to acquire vehicle dynamics data;
   a device to identify a state of directional stability from the acquired data;
   a device to measure a torque of the steering system;
   a device to calculate a preliminary compensation torque, or a final torque at least in a case of a force equilibrium being present in a directionally stable state, from the measured torque;
   a device to actuate the active power steering assistance system with a final compensation torque based on the preliminary compensation torque to counter-compensate the measured torque of the steering system; and
   a device to estimate and/or acquire data on restoring forces of the steering system, wherein the data on restoring forces is taken into account in the calculation of the final compensation torque.

14. A vehicle comprising a steering system as claimed in the claim 13.

15. A method of controlling directional stability of a vehicle, the method comprising:
   acquiring vehicle dynamics data of the vehicle;
   determining a directional stability state of the vehicle based on the vehicle dynamics data;
   determining a torque value based on the vehicle dynamics data;
   calculating a torque component based on a difference between the torque value and a torque of a steering system of the vehicle;
   calculating a preliminary compensation torque on the basis of the torque component;
   calculating a final compensation torque by adding the preliminary compensation torque and the torque value; and
   actuating a power steering assistance system of the vehicle according to the final compensation torque.

16. The method of claim 15, wherein the directional stability state of the vehicle is determined according to whether a value of the vehicle dynamics data is below or above a predetermined threshold value for a predetermined time period or a predetermined travel distance.

17. The method of claim 15, wherein the torque of the steering system is a torque applied by a driver to a steering wheel of the vehicle.

18. The method of claim 15, wherein the vehicle dynamics data comprises a lateral acceleration of the vehicle and the torque value is based on the lateral acceleration.

19. The method of claim 15, wherein at least one of the final compensation torque and the preliminary compensation torque is calculated from the torque of the steering system over a plurality of directionally stable states, or at a plurality of times when directional stability occurs and averaged to calculate an average long-term compensation torque.

20. A steering system to control a directional stability of a vehicle, comprising:
   an active power steering assistance system;
   a sensor to detect vehicle dynamics data of the vehicle;
   a sensor to detect a torque of a steering system of the vehicle; and a controller configured to:
- determine a torque value based on the vehicle dynamics data;
- calculate a torque component based on a difference between the torque value and the torque of the steering system;
- calculate a preliminary compensation torque on a basis of the torque component;
- calculate a final compensation torque by adding the preliminary compensation torque and the torque value; and
- actuate the active power steering assistance system based upon the final compensation torque.

21. The steering system of claim 20, wherein the controller is configured to determine a directional stability state of the vehicle based upon the vehicle dynamics data, wherein if the vehicle is not in a directional stable state the control proceeds with determining the torque value, calculating the torque component, calculating the preliminary compensation torque, and calculating the final compensation torque.

22. A method of controlling directional stability of a vehicle, the method comprising:
- determining a torque value to compensate for short-term pull/drift;
- calculating a torque component based on the torque value and a torque of the steering system;
- calculating a preliminary compensation torque based on the torque component to compensate for long-term pull/drift;
- calculating a final compensation torque based on a combination of the preliminary compensation torque and the torque value used to calculate the torque component; and
- actuating a power steering assistance system of the vehicle according to the final compensation torque.

23. The method of claim 22, further comprising:
- acquiring vehicle dynamics data of the vehicle; and
- determining the torque value based on the vehicle dynamics data.

24. The method of claim 23, wherein the torque component is determined by removing the torque value based on the vehicle dynamics data from a torque of a steering system of the vehicle.

* * * * *